(12) United States Patent
Borisoglebski et al.

(10) Patent No.: US 12,120,264 B2
(45) Date of Patent: Oct. 15, 2024

(54) COMMUNICATIONS RECORDING

(71) Applicant: Truphone Limited, London (GB)

(72) Inventors: Igor Borisoglebski, London (GB); João Paulo Real Bugalho Marques Heitor, London (GB); Gonçalo Nuno Dos Santos Lopes Pereira, London (GB); Victor Manuel Vieira Pinto, London (GB)

(73) Assignee: Truphone Limited, London (GB)

( * ) Notice: Subject to any disclaimer, the term of this patent is extended or adjusted under 35 U.S.C. 154(b) by 111 days.

(21) Appl. No.: 17/877,204

(22) Filed: Jul. 29, 2022

(65) Prior Publication Data

US 2022/0368800 A1 Nov. 17, 2022

Related U.S. Application Data

(63) Continuation of application No. PCT/EP2020/055069, filed on Feb. 26, 2020.

(30) Foreign Application Priority Data

Jan. 30, 2020 (GB) ..................................... 2001327

(51) Int. Cl.
*H04M 3/42* (2006.01)
*H04L 65/1016* (2022.01)

(52) U.S. Cl.
CPC .... *H04M 3/42221* (2013.01); *H04L 65/1016* (2013.01); *H04M 2203/301* (2013.01)

(58) Field of Classification Search
CPC ....... H04M 3/42221; H04M 2203/301; H04M 7/0078; H04L 65/1016; H04L 65/103;
(Continued)

(56) References Cited

U.S. PATENT DOCUMENTS 10,069,875 B1 * 9/2018 Naidu ................. H04L 65/1104
10,298,696 B2 * 5/2019 Forsberg ................. H04L 67/51
(Continued)

FOREIGN PATENT DOCUMENTS

EP 2781078 A1 9/2014
GB 2489801 A 10/2012
(Continued)

OTHER PUBLICATIONS

3GPP TS 33.107 V15.6.0 (Jun. 2019) (Year: 2019).*
(Continued)

*Primary Examiner* — Akelaw Teshale
(74) *Attorney, Agent, or Firm* — Whitestone Law, PLLC

(57) ABSTRACT

There is provided a method, and application server for enabling recording of communications transmitted via an Internet Protocol Multimedia Subsystem Network. A call request is received from a first party to call a second party and a database, comprising a plurality of subscriber profiles, is queried to obtain subscriber configuration data relating to at least one of the first party and the second party. Based on the subscriber configuration data, media streams are caused to be transmitted between the first party and a Media Resource Function, between the second party and the Media Resource Function, and from the Media Resource Function to a recording device to record at least part of a call between the first and second party. A communications network and a user device are also provided.

14 Claims, 4 Drawing Sheets

(58) Field of Classification Search
CPC ............. H04L 65/1076; H04L 65/1093; H04L 65/1043
See application file for complete search history.

(56) References Cited

U.S. PATENT DOCUMENTS

| | | | | |
|---|---|---|---|---|
| 10,575,197 | B1* | 2/2020 | Briggs | ............... H04W 24/06 |
| 2002/0155847 | A1 | 10/2002 | Weinberg et al. | |
| 2010/0039946 | A1* | 2/2010 | Imbimbo | ............ H04M 3/2281 |
| | | | | 370/252 |
| 2010/0118865 | A1* | 5/2010 | Jung | ................ H04L 65/1016 |
| | | | | 370/352 |
| 2014/0155040 | A1* | 6/2014 | Tagg | ............... H04M 3/42221 |
| | | | | 455/432.1 |
| 2015/0222753 | A1* | 8/2015 | Noldus | .............. H04M 3/533 |
| | | | | 455/412.2 |
| 2017/0289349 | A1* | 10/2017 | Ou | ..................... H04M 3/567 |
| 2018/0376171 | A1* | 12/2018 | Dhandapani | ....... H04N 21/8549 |
| 2019/0281156 | A1 | 9/2019 | Nagai et al. | |

FOREIGN PATENT DOCUMENTS

| | | | | |
|---|---|---|---|---|
| WO | WO-2010056033 | A2 * | 5/2010 | ............. H04L 12/66 |
| WO | WO-2013026457 | A1 * | 2/2013 | ......... H04L 65/1016 |
| WO | WO-2014040621 | A1 * | 3/2014 | ......... H04L 65/1069 |

OTHER PUBLICATIONS

United Kingdom Combined Search and Examination report dated Jun. 30, 2020 for GB Application No. GB2001327.2.
United Kingdom Examination report dated Jun. 13, 2022 for GB Application No. GB2001327.2.
International Search report and Written Opinion dated Jul. 3, 2020 for International PCT Application No. PCT/EP2020/055069.
"3rd Generation Partnership Project; Technical Specification Group Services and System Aspects; 3G security; Lawful Interception architecture and functions (Release 15)", 3GPP Standard; Technical Specification; 3GPP TS 33.107, 3rd Generation Partnership Project (3GPP), Mobile Competence Centre ; 650, Route Des Lucioles ; F-06921 Sophia-Antipolis Cedex ; France, vol. SA WG3, No. V15.6.0, Jun. 17, 2019 (Jun. 17, 2019), pp. 1-386.

* cited by examiner

COMMUNICATIONS RECORDING

CROSS-REFERENCE TO RELATED APPLICATIONS

This application is a continuation of International Application No. PCT/EP2020/055069, filed Feb. 26, 2020 which claims priority to United Kingdom Application No. GB 2001327.2, filed Jan. 30, 2020, under 35 U.S.C. § 119(a). Each of the above referenced patent applications is incorporated by reference in its entirety.

BACKGROUND

The present disclosure relates to recording communications, and in particular, but not exclusively, to recording communications transmitted via an Internet Protocol Multimedia Subsystem.

Description of the Related Technology

There are several circumstances that require the recording of phone communications. These circumstances generally address one of three purposes: lawful intercept, personal note taking, and non-repudiation of contracts.

Providing non-repudiation of verbal agreements and recording of communications that might result in a financial transaction to avoid issues of insider dealing has been mandated by government regulation in several countries. In particular, the financial industry has this requirement. Due to increasing regulatory and compliance requirements for this industry, there is an increment of the number of countries in which communications are required to be recorded and there is also a growing requirement to record and store data in the financial entity's own premises within its own infrastructure.

Lawful intercept has different considerations and will usually be carried out by authorities in the relevant jurisdiction. These authorities will typically have some form of privileged access to a network, rendering the technical considerations involved in lawful intercept somewhat different from those involved in recording of communications by a private party such as a bank (even if the communications recording is required to meet a legal obligation).

The two-stage dialling service provides recording of calls over a telecommunications network, however, this procedure can be bypassed.

Mobile terminals, particularly smart phones, have been programmed to automate the two-stage dialling and to intercept the normal call progression. However, such applications are easily bypassed, disabled, or the equipment changed.

Lawful intercept is also different in that it does not provision services to subscribers or employees of subscribers and it operates under specific restraints (it typically must not interfere with the call if it cannot be recorded).

Historically, mobile phones provided voice call services over circuit-switched networks, rather than over Internet Protocol, IP, packet-switched networks. Alternative methods of delivering voice or other multimedia services are now available on smartphones, for example Voice over Internet Protocol, but were not initially standardized across the industry. The IP Multimedia Subsystem or IP Multimedia Core Network Subsystem (IMS) consists of a standards-based architectural framework for delivering multimedia communications services such as voice, video and text messaging over IP networks and provides standardization across the industry.

Voice over Long Term Evolution (VoLTE) is the industry-recognised solution for providing a packet voice service, over IP via LTE access technology. VoLTE uses IMS technology, which provides a common platform to provide an enriched call experience by also deploying conversational video (ViLTE—Video over LTE) and RCS-based (Rich Communication Services) Enhanced Messaging. Voice Over IP (VoIP), Voice Over New Radio (VoNR) and Voice Over WiFi (VoWiFi) are other industry-recognised solutions.

With the continuously increasing momentum of LTE deployments, IMS is seen throughout the industry as the common service platform for deploying communication services over IP technology (e.g. VoLTE, ViLTE, RCS).

It is desired to more efficiently perform communications recording in a telecommunications network without limitation to specific network requirements and resorting to the next-generation mobile networks.

SUMMARY

According to a first aspect of the present disclosure, there is provided a method of recording communications transmitted via an Internet Protocol Multimedia Subsystem, IMS, network, the method comprising: receiving a call request from a first party to call a second party; querying a database comprising a plurality of subscriber profiles to obtain subscriber configuration data relating to at least one of the first party and the second party; and based on the subscriber configuration data: cause a first media stream to be transmitted between the first party and a Media Resource Function, MRF; cause the MRF to transmit a second media stream between the MRF and the second party; and cause the MRF to transmit a third media stream from the MRF to a recording device for recording at least part of a call between the first party and the second party.

According to a second aspect of the present disclosure, there is provided an application server for enabling recording of communications transmitted via an Internet Protocol Multimedia Subsystem, IMS, network, the application server comprising at least one processor and memory, the memory comprising computer readable instructions which, when executed by the at least one processor, cause the at least one processor to: obtain call request data relating to a call request from a first party to call a second party; obtain subscriber configuration data relating to at least one of the first party and the second party; and based on the subscriber configuration data: cause a first media stream to be transmitted between the first party and a Media Resource Function, MRF; cause a second media stream to be transmitted between the second party and the MRF; and cause the MRF to transmit a third media stream from the MRF to a recording device for recording at least part of a call between the first party and the second party.

According to third aspect of the present disclosure there is provided a communications network adapted to record communications transmitted therethrough, the communications network comprising: a session border controller for receiving call requests from a first party to a second party; a database comprising a plurality of subscriber profiles including subscriber configuration data relating to subscribers of a communications recording service; a Media Resource Function, MRF; and an application server as described above.

According to a fourth aspect of the present disclosure there is provided a user device comprising at least one processor and at least one computer-readable storage medium, the computer-readable storage medium storing instructions which, when executed by the at least one processor, cause the at least one processor to: receive a user input indicative of a decision to make a call using a call recording service; select an identity associated with the user device, wherein the selected identity is associated with subscriber configuration data stored in a database in a communications network, the subscriber configuration data specifying a manner in which the call recording service is to be provided to the user device; and use a Mobile Station International Subscriber Directory Number, MSISDN, associated with the selected identity to make the call.

Further features and advantages of the present disclosure will become apparent from the following description, given by way of example only, which is made with reference to the accompanying drawings.

DETAILED DESCRIPTION

Certain examples described herein provide a method for recording communications transmitted via an IMS network. The communications either originate or terminate at mobile devices associated with subscribers of IP multimedia services provided via the IMS network. In some examples, configuration data relating to the subscriber(s) of the IP multimedia services are used to configure the call and the recording of at least part of said call.

Figure 1:
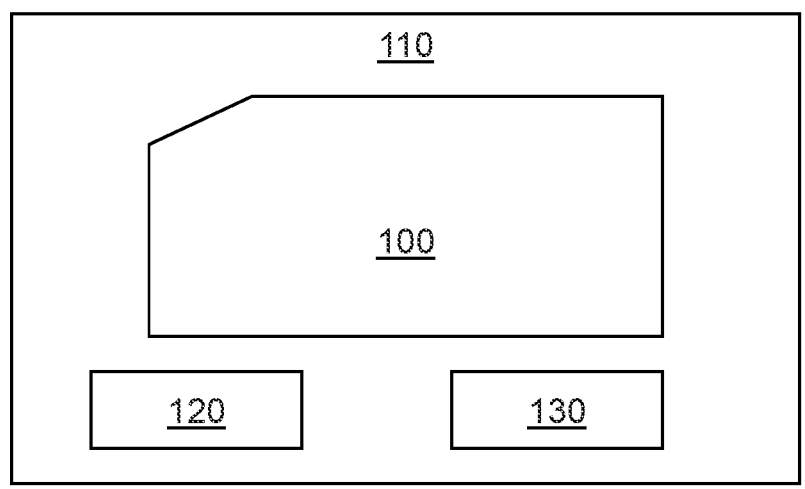
FIG. 1 is a schematic diagram illustrating user equipment comprising a secure module according to an example.

FIG. 1 illustrates a secure module 100 included in a user device, or user equipment (UE) 110. The UE 110 comprises at least one computer-readable storage medium 120 and at least one processor 130. The computer-readable storage medium 120 and the at least one processor 130 are communicatively coupled such that the processor 130 may execute instructions stored on the at least one storage medium 120. Examples of UEs, include mobile terminals such as mobile phones, smart phones, tablets, computers or other cellular network enabled devices. It will be appreciated that the at least one computer-readable storage medium 120 may run on mobile devices, desktop computers or web browsers. The at least one computer-readable storage medium 120 may comprise instructions which, when executed by the at least one processor 130, may provide a session trigger for a method of recording communications transmitted via an IMS network. The method of recording communications will be described below in relation to FIG. 2.

The secure module 100 may comprise a Universal Integrated Circuit Card, UICC, an electronic UICC, eUICC, an integrated UICC, iUICC, or a soft Subscriber Identity Module, SIM. In some examples, the methods described herein may be implemented with a UICC, an eUICC, an iUICC or a soft SIM included in a UE 110 making or receiving a call. In some examples, the UE 110 may comprise a consumer device, or a machine or object in an Internet of Things, IoT, or Machine-2-Machine, M2M context.

The processor 130 may possess proactive capacity in the sense that it is able to interact directly with external elements and cause the secure module 100 to send proactive commands to a cellular network, including data for purposes of identification or authentication to a cellular network as well as data to be recorded and to trigger the execution of a method of recording communications transmitted via the IMS network as will be described with respect to FIG. 2.

Figure 2:
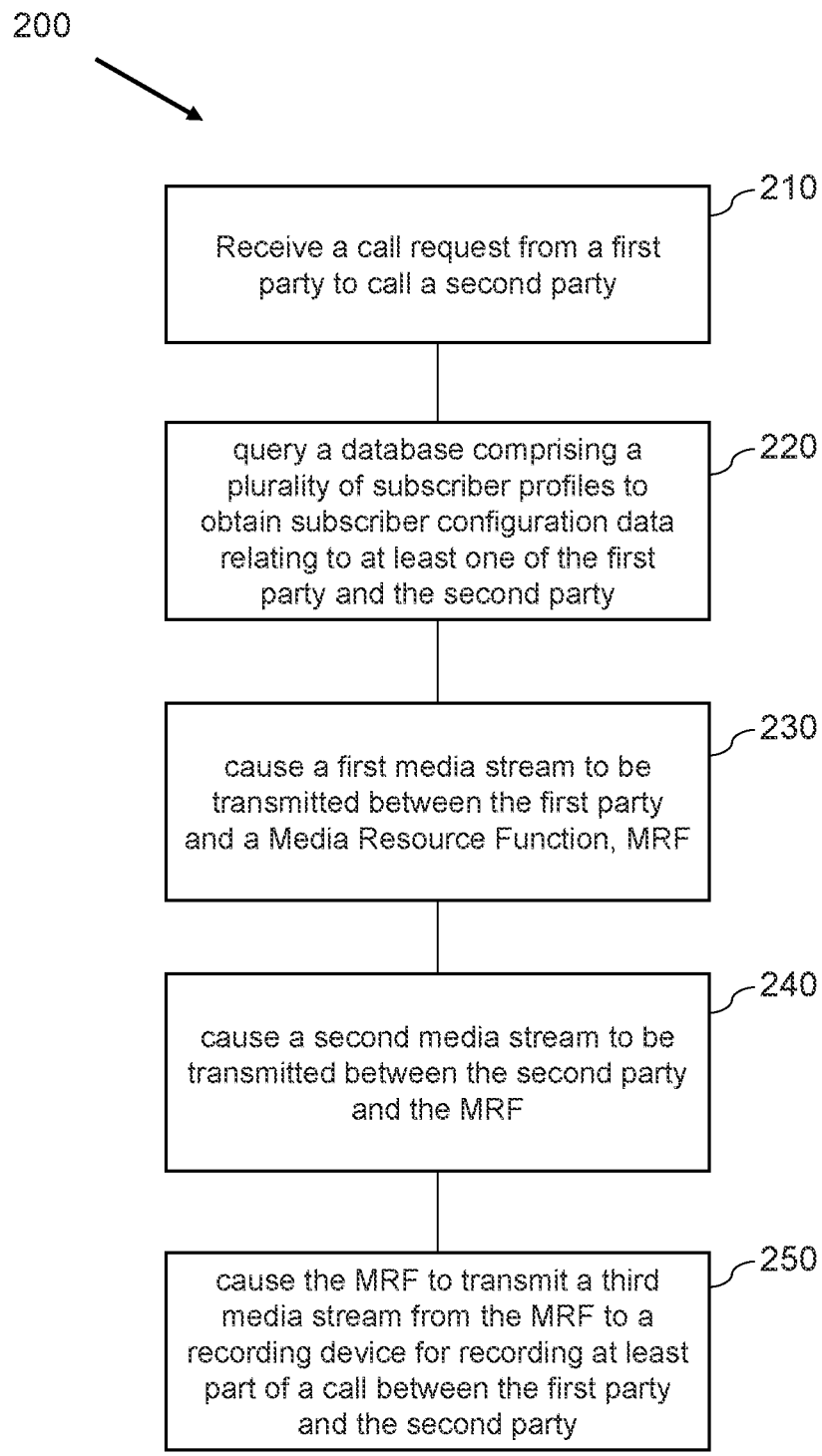
FIG. 2 is a flow diagram illustrating a method according to an example.

FIG. 2 illustrates a flow diagram of a method 200 of recording communications transmitted via an IMS network. The method 200 may be triggered upon making a call from a mobile terminal 110 registered with a call recording service provided via the IMS network, or when receiving a call request to call a mobile terminal 110 registered with a call recording service provided via the IMS network. At block 210, the method 200 comprises receiving a call request from a first party to call a second party. The call may be initiated at a mobile terminal 110 or at a fixed terminal, a fixed terminal being understood as a user equipment provisioned with fixed telecommunication services. Examples of fixed terminals including landline telephones, or other terminals which are located in a particular location and/or which provide telecommunications services to users via fixed line networks.

At block 220, the method 200 comprises querying a database comprising a plurality of subscriber profiles to obtain subscriber configuration data relating to at least one of the first party and the second party. In an example, the database is a home subscriber server, HSS, comprising a database storing information relating to subscribers of IP multimedia services. The subscriber profile configuration data may comprise data relating to the types of services for which a subscriber is registered and, in some cases, detailed information regarding a manner in which said IP multimedia services are provided to the subscriber.

At block 230, the method 200 comprises causing a first media stream to be transmitted between the first party and a Media Resource Function (MRF). An MRF is a component of IMS networks which provides media related functions such as media manipulation, including voice stream mixing, splitting, forking, and playing of tones and announcements. In the present example, the first media stream is a Real-time Transfer Protocol, RTP, stream. Although, it will be appreciated that other suitable protocols may be used for the media stream.

At block 240, the method 200 comprises causing a second media stream to be transmitted between the MRF and the second party. The second media stream is also an RTP stream, although again, other suitable protocols may be used. The first and second media streams may also be transmitted between the MRF and the second and first parties respectively in order to provide the call between the first and second parties. Alternatively, the MRF, may set up further media streams, which are configured end-to-end with the first and second media streams in order to transmit the media between the first and second parties to provide the call.

At block 250, the method 200 comprises causing the MRF to transmit a third media stream from the MRF to a recording device for recording at least part of a call between the first party and the second party.

In this way, at least part of the call between the first party and the second party is recorded. This process may occur automatically and without the intervention of either the first or the second party. The subscriber profile configuration data comprises information relating to the specific configuration of the call recording as will be described further below.

In the present example, the recording device is a node located in the IMS network. The recording device is adapted to receive the third stream and store data received via the third stream in a storage medium for recording at least part of the call between the first and second parties. The recording device may be a physical component comprising a processor and a memory or may be a virtualised component implemented in a server or node in the IMS network.

In some cases, the subscriber profile configuration data is processed in order to select an MRF. For example, the subscriber profile configuration data may be processed to identify a geographic location of the subscriber of the call recording service, the subscriber being either of the first or second parties. An MRF which is nearest to either of the first or second parties may be selected as the MRF. This may reduce call latency, and jitter, which might otherwise occur if a more distant MRF were to be selected.

The subscriber profile configuration data may specify other settings relating to the handling of call recording. For example, the subscriber profile configuration data may be processed to determine a manner in which the call is established. The manner in which the call is established may include, but is not limited to, a manner in which any of the first and second parties are notified that the call is being recorded, and a manner in which the third media stream is generated.

In at least some territories it is a legal requirement to inform parties to a call if said call is being recorded. Accordingly, notifications are transmitted to the parties during the call, by the MRF. These notifications may take the form of audio notifications played at the start of a call to inform either or both of the first and second parties that the call is being recorded. Alternatively, or additionally, notifications in the form of beeps or tones may be played during the call, for example periodically, to inform either or both of the first and second parties that the call is being recorded. The precise notification method which is used may be specified in the subscriber profile to allow reliable notification of the call recording and to allow the settings to be easily updated and modified based on the territory in which the first or second party are located.

The subscriber profile may also specify which recording device is to be used to record the call. For example, where the subscriber profile configuration data corresponds to the first party, the first party's subscriber profile may specify that the calls are to be recorded at a specific recording device located in the IMS network. In this case, the subscriber configuration profile data may be processed to determine the recording device to which the third media stream is to be transmitted from the MRF.

In alternative examples, recording devices which are external to the IMS network may be used to record the call, for example third party and cloud-based recording devices may be used to record the call. In this case, the third media stream may be established by sending a Session Initiation Protocol, SIP, invite to a Session Border Controller, SBC, associated with the recording device. An SBC is a 3GPP compliant network element providing the function of securing voice over IMS infrastructures while providing interworking between incompatible signalling messages and media flows from end devices or application servers. In the present example, the SBC is to be understood as a 3GPP compliant network element with all functions and interfaces supporting Proxy Call Session Control Function (P-CSCF), Emergency Call Session Control Function (E-CSCF), Emergency Access Transfer Function (EATF), Breakout Gateway Control Function (BGCF), IMS Access Media Gateway (IMS-AGW), IMS-Application Level Gateway (IMS-ALG), Access Transfer Control Function (ATCF), Access Transfer Gateway (ATGW), Interconnect Border Control Function (IBCF), Transition GateWay (TrGW). In some examples, a first SBC in the IMS network is sent a SIP invite, and a SIP invite is then sent to another SBC in different network in which the recording device is located.

As briefly described above, the MRF is capable of performing a variety of media related functions, and hence there are a variety of ways in which the call can be recorded. In a first example, the third media stream transmitted from the MRF to the recording device is generated by forking either of the first or second media streams. In this way, the third media stream may transmit media generated by either of the first or second parties to the call to the recording device, in other words either the caller stream or the called stream. This may be the case where for example the first party is a subscriber of the call recording service but is not authorised to cause the recording of the second party's part of the call. This may be the case where the recording service provided to the first party is configured to record the call at a recording device owned by the first party's organisation or company.

In a second example, the third media stream is generated by mixing the first and second media streams. This may be the case where both parts of the call are to be recorded.

In a third example, the third media stream is generated by forking either of the first or second media streams and the MRF is caused to transmit a fourth media stream being generated by forking the other of the first or second media streams.

In an example, the method further comprises monitoring whether the third media stream is delivered to the recording device and performing at least one predetermined action based on the monitoring. The at least one predetermined action may comprise a variety of different actions, and in some cases these actions are specified in the subscriber configuration data. As such, the subscriber profile configuration data may be processed to determine the at least one predetermined action to be performed. Providing this information in the subscriber profile allows increased customisability in, and reconfiguration of, the predetermined actions to meet user and legal requirements.

In one implementation, if it is determined in the monitoring that the third media stream is not being delivered to the recording device, the at least one predetermined action may comprise stopping transmission of at least one of the first media stream or the second media stream, in other words the call is terminated. Where call recording is a legal requirement, such as for financial institutes as specified by the Financial Conduct Authority (FCA), it is desirable to prevent calls from proceeding unless they are being recorded. To this end, the method described above provides automatic and efficient handling of call recording for members of financial institutions who are subscribed to IP multimedia services and in particular call recording services, in a legal and robust manner.

Monitoring that the third media stream is delivered to the recording device may comprises continuously receiving a notification indicating whether the third media stream is being delivered to the recording device. In this way, continual confirmation that the call is being recorded is provided, and any short-term or transitory failures in delivery of the third media stream are identified such that appropriate action can be taken. In some cases, it may be acceptable for a call to be mostly recorded where brief drops in signal to the recording device are tolerated, however, in other cases it is desirable, and potentially even legally required, that an entirety of the call is recorded. In this case, even if there is a momentary lapse in the third media stream it may be desired that the call recording service cause the call to end to satisfy these legal requirements. As such, the continual monitoring of the delivery of the third media stream to the recording device is beneficial.

Figure 3:
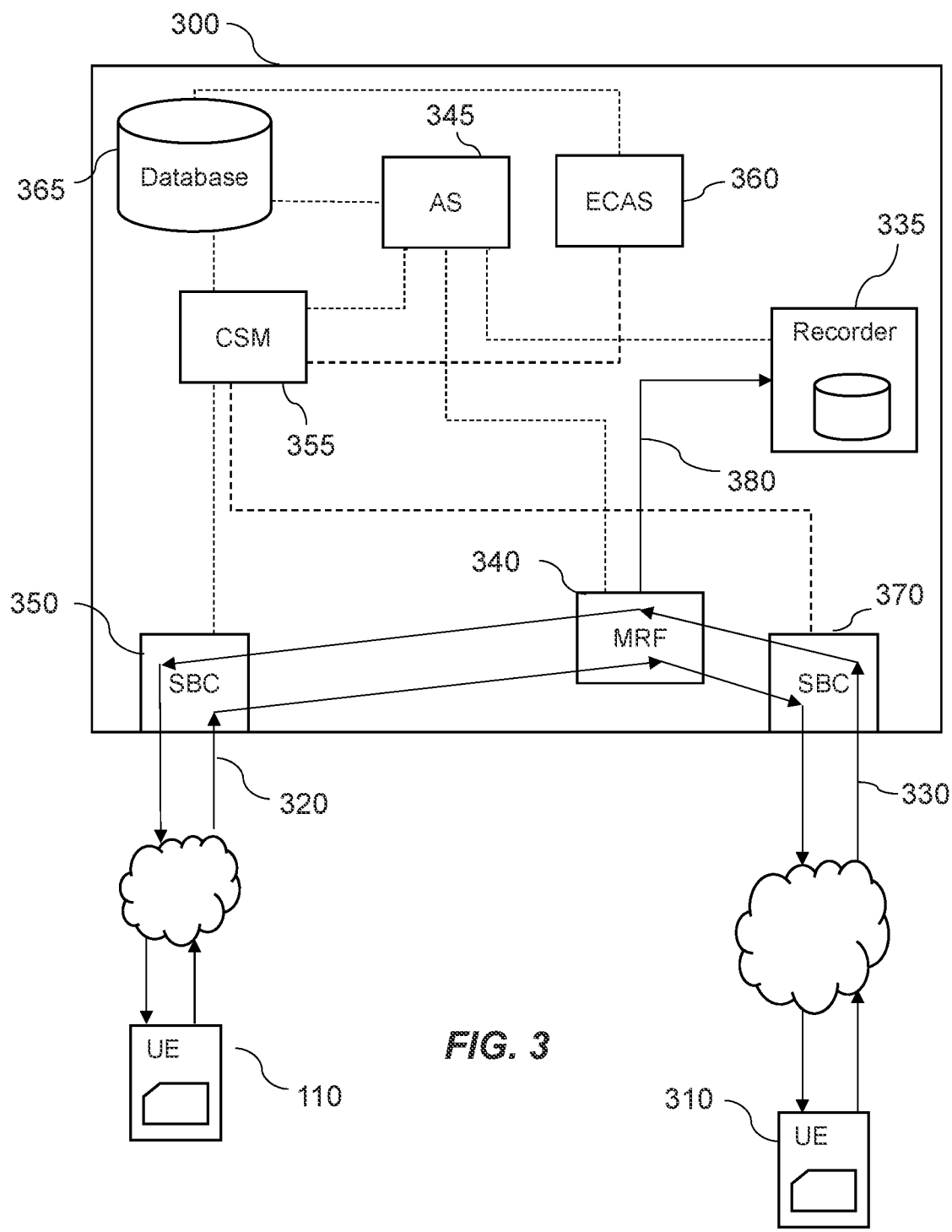
FIG. 3 is a schematic diagram illustrating network equipment according to an example.

FIG. 3 shows schematically at least part of an IMS network 300 in which the present disclosure may be implemented. As above described in relation to FIG. 2, the method 200 may be triggered upon making a call from a UE 110 or upon receiving a call request to call a UE 110, where the UE 110 is associated with a subscriber of the call recording service. In this example the UE 110 sends an initial call request to call a second UE 310. The user of the UE 110 is the first party initiating a mobile originating (MO) outbound call by dialling the number associated with the UE 310. The call request reaches the IMS network 300 at an SBC 350. The SBC 350 being a 3GPP compliant network element providing the function of securing voice over IMS infrastructures while providing interworking between incompatible signalling messages and media flows from end devices or application servers. Signalling communications between components are shown in FIG. 3 using broken lines, and solid lines are used to show media streams.

The SBC 350 communicates with a Core Session Manager (CSM) 355 to exchange information concerning the establishment and control of the call. This communication between the SBC 350 and the CSM 355 is provided through common channel signalling via a separate telecommunication channel than that used for transmitting media during the call. Common channel signalling being understood as the transmission of control information via a separate telecommunication channel than that used for the communications. The CSM 355 is a node providing session core functions. In the present example, the CSM 355 is to be understood as a 3GPP compliant network element with all core session and breakout gateway functions and interfaces supporting Interrogating Call Session Control Function (I-CSCF), Serving Call Session Control Function (S-CSCF) and Breakout Gateway Control Function (BGCF).

The information exchanged between the SBC 350 and the CSM 355 may comprise: a call behaviour query of the calling and/or called party to identify the call behaviour, the call behaviour being dependent on whether the call is MO, mobile terminating (MT), or both MO and MT; a routing query based on the calling and called numbers, associated with UE 110 and UE 310, to determine if the call is MO, MT or MO to MT; a call property query to determine the appropriate media to be played to the first and second party in establishing the call; a recorder query to identify which recording device will receive at least the third media stream and store at least part of the call; a subscriber profile configuration query to determine the operating behaviour of the network for the subscriber; a geographic determination query to select an appropriate MRF to serve the subscriber; and a service delivery platform operations query to determine the operations for supporting the subscriber profile.

The CSM 355 and an application server (AS) 345 communicate through common channel signalling to exchange information concerning the establishment and control of the call. This communication may comprise the abovementioned information, exchanged between the SBC 350 and the CSM 355. The AS 345 obtains call request data relating to a call request from the first party to call the second party. The call request data may comprise the queries described above as well as numbers identifying each of the first and second parties, for example, telephone numbers associated with UE 110 at which the call request originates and the UE 310 with which a call is to be established. The call request data may be used by the AS 345 to obtain subscriber configuration data.

The network 300 also includes an Evolved Communications Application Server (ECAS) 360. The ECAS 360 provides IMS application server functions including voice-based applications like VoLTE, VoIP, VoNR, and VoWiFi. These applications are executed in Runtime and implement service logic that enables the definition of call flow logic. The ECAS 360 uses the database 365 as a user data repository for the retrieval of subscriber data in Runtime.

The CSM 355 and an ECAS 360 communicate through common channel signalling to exchange information concerning the establishment and control of the call. This communication may comprise the above mentioned information, exchanged between the SBC 350 and the CSM 355. The CSM 355 obtains a call flow logic in the network 300.

The network 300 includes a database 365 comprising subscriber profiles. The subscriber profiles include subscriber configuration data. The subscriber configuration data comprises information relating to services to be provided to subscribers. Subscriber configuration data may include data relating to call properties, specified recorders to be used to record said subscribers' calls, a recording configuration, and other relevant information relating to the subscriber, such as location. In some examples, the database 365 is implemented in a Home Subscriber Server (HSS). The database 365 may be queried by any suitable network component. In the present example, the application server 345 queries the database 365 to obtain subscriber configuration data relating to at least one of the first and second parties.

Based on the subscriber configuration data the AS 345 may then cause a first media stream 320 to be transmitted between the first party and the MRF 340 comprised in the network 300. This may be performed by instructing the SBC 350 to route a media stream from the UE 110 to the MRF 340, or to the second UE 310 via the MRF 340. Instructing the SBC 350 may be performed by the AS 345 providing signalling via the CSM 355 or directly to the SBC 350.

The AS 345 causes a second media stream 330 to be transmitted between the second party, associated with the second UE 310 and the MRF 340. This may be performed by instructing an SBC 370 to route a media stream between the UE 310 and the MRF 340. The first 320 and second 330 media streams are shown in FIG. 3 as comprising multiple legs although it will be appreciated in practice that each stream may comprise a single leg. To provide the call between the first party and the second party the first 320 and second 330 media streams may each be routed between the first and second party via the MRF 340, as shown in FIG. 3. In other examples, end-to-end streams are established at the MRF to provide the call between the first party and the second party.

The AS 345 also causes a third media stream 380 to be transmitted from the MRF 340 to the recording device 335 for recording at least part of the call between the first and second parties. As described above, this may be performed by forking either of the first 320 and second 330 media streams or mixing the first 320 and second 330 media streams. The AS 345 may also cause a fourth media stream to be transmitted from the MRF 340 to the recording device 335, for example so that the first 320 and second 330 media streams may be recorded separately at the recording device 335.

In order to reduce the call latency and improve the call quality and user experience, the traffic from each of the UEs 110 and 310 is delivered to the closest connection for RTP media traffic, minimizing RTT, delays and jitter. To achieve this the following configurations are made:
- each subscriber to the call recording service is provided a corresponding subscriber profile in the database 365 configured to use a Temporary Service Access Number (TSAN) belonging to a TSAN range configured for each country;
- the TSAN ranges to be applied are defined in the network configuration and are triggered by a service Key in the database 365, depending on the subscriber profile.

In the present example, the recording device 335 is a physical node located in the IMS network 300 comprising a processor and a storage medium. The storage medium comprises computer-readable instructions which, when executed by the processor in the recording device 335, cause said processor to receive at least the third media stream 380 and to record the data, transmitted via the third media stream 380, to the storage medium. The recording device 335 may be configured to replicate, encrypt and retrieve on demand, communications data (both voice calls and SMS messages) stored in the storage medium. This recording device 335 may comprise a graphical user interface providing input and/or output user interface functions. It will be appreciated that a recording device 335 may be a physical node in the network 300 or may be a virtualised node. The recording device 335 may be a hosted recording device when it is located within the structure of the network 300 providing the recording service. Alternatively, the recording device may be an externally hosted recording device located within the premises of a subscriber to the call recording services, for example at the premises of a financial institution which procures call recording services via an IMS network 300 as described above. When a hosted recording device is used, the network 300 will invite this recording device into the call for recording. When an externally hosted recording device is used, the network will invite the relevant SBC into the call which will then invite the relevant externally hosted recording device into the call. For example, a SIP invite may be sent to a relevant SBC associated with recording device 335.

The recording device 335 may support session timers, so that it can expect to receive regular updates within a set time frame. If the session timer is not responded to, the network may terminate the call. Alternatively, or additionally, the call may proceed and be terminated either by the first party terminating the call or by the second party terminating the call.

In an example, the AS 345 is adapted to monitor delivery of the third media stream 380 to the recording device 335 and to perform at least one predetermined action in response to the monitoring. The AS 345 notifies the MRF 340 if the third media stream 380 is being delivered to the recording device 335 or not. In some examples, the predetermined action includes instructing the MRF 340 to stop transmission of either of the first 320 or second 330 media streams if the third media stream 380 is not delivered to the recording device 335.

In some examples, not illustrated, the recording device 335 may be a primary recording device and a secondary recording device may also be provided. The primary and secondary recording devices may be specified in the subscriber profiles for each geographical location. If the primary recording device is not reachable then the secondary recording device is invited into the call. Additional recording devices may be available to duplicate the recording, to record each of the first 320 and second 330 streams separately or to be used as passive backup if the first recording device fails.

The AS 345 may send metadata information to the recording device 335 when the call is established. The recording device 335 will store this information along with the communications data received via the third media stream 380.

In examples, where the subscriber of the recording service is the second party, associated with the second UE 310 and the first party is calling from a fixed terminal, the user of the fixed terminal is the first party initiating a MT inbound call by dialling the number associated to the UE 310. When the call request reaches the mobile network 300 of the second party 310 receiving the call, IMS network 310 is agnostic to the access network from which the call originates, and the network 300 performs the method of recording communications described above in relation to FIGS. 2 and 3.

Figure 4:
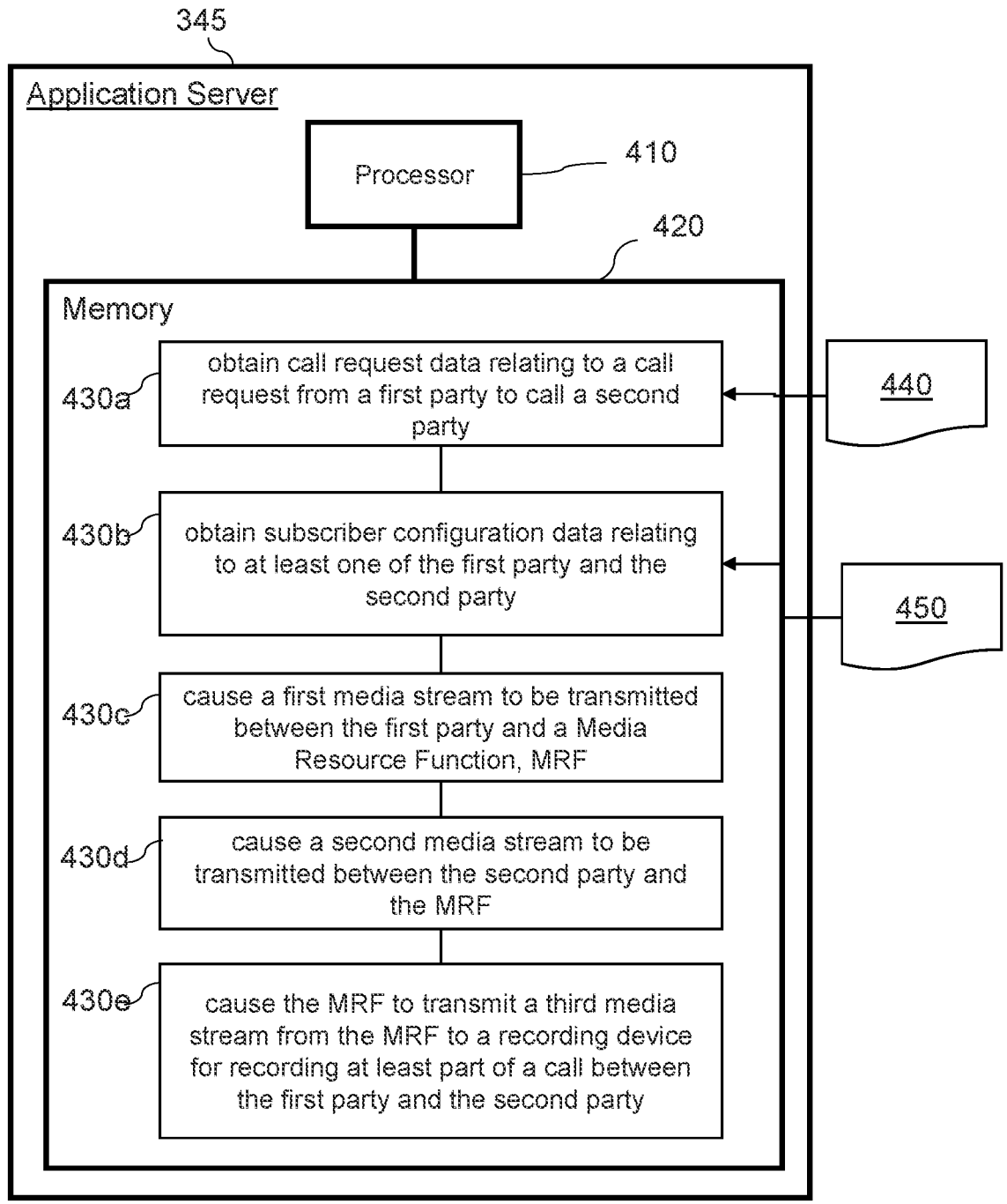
FIG. 4 is schematic diagram illustrating an application server according to an example.

FIG. 4 shows schematically, the application server 345 suitable for enabling recording of communications via the IMS network 300. The application server 345 comprises at least one processor 410 and memory 420. The memory 420 comprises computer-readable instructions 430*a* to 430*e* which when executed by the at least one processor 410 cause the processor 410 to perform the steps as described above. The steps including: obtaining call request data 440 relating to a call request from a first party to call a second party; obtaining subscriber configuration data 450 relating to at least one of the first party and the second party; and based on the subscriber configuration data 450: cause a first media stream to be transmitted between the first party and an MRF; cause a second media stream to be transmitted between the second party and the MRF; and cause a third media stream to be transmitted from the MRF to a recording device for recording at least part of a call between the first party and the second party.

The AS 345 may also be adapted to process the subscriber configuration 440 to determine a number of actions and parameters relating to the call recording, as described above with respect to FIG. 2. The AS 345 may be implemented as a computer comprising at least one processor 410 and memory 420 positioned at a specific location within the network. Alternatively, the AS 345 may be a distributed computing device wherein the at least one processor may comprise multiple cores distributed geographically. In some examples, two or more computers/servers may be used to implement the application server 345. The functions performed by the application server 345 may be suitably distributed to appropriate hardware within the network 300.

The subscriber profiles corresponding to subscribers of the call recording service may be accessed and/or modified by said subscribers. UE 110 may implement a program, or application, which provides a user of said UE 110 with an interface to generate and transmit subscriber reconfiguration data suitable for modifying their subscriber profile. The subscriber reconfiguration data is transmitted to the database 365 where it is used to modify the subscriber configuration data associated with the relevant subscriber profile.

Returning to FIG. 1, a secure module 100 is included in a UE 110 which comprises at least one computer-readable medium 120 and at least one processor 130.

For purposes of authentication with the network, the computer-readable storage medium 120 may use an automatically or on demand provisioned identity. For example, this identity may be an identity stored in the database 365 and associated to the UE 110.

A session trigger, to perform a method 200 as described herein, may include making a call from, or receiving a call at, the UE 110. Alternatively, or additionally, a session trigger may include the user launching an application on the UE 110 and/or the user launching the application on the UE 110 and using the application to make a call. In some examples, the computer-readable storage medium 120 may comprise an application which is capable of interfacing with a cellular network. Functionalities described herein may be implemented as part of a service provided by the application comprised in the storage medium 120 which is run on a user equipment 110. The application may comprise a set of computer-readable instructions to provide given services, such as call recording via the methods described above, making and receiving calls at the UE 110 and/or to provide a user interface for users of the UE 110. The application may be downloaded and stored on the user equipment 110 and the session trigger initiating a user session of the call recording service may be instantiated by the application. For example, the application may cause a subscriber profile, associated with the application and/or the UE 110, to be modified to include call recording services as described above in relation to FIGS. 2 and 3. In an example, the UE 110, which in some examples may be referred to as a user device 110, is adapted to receive a user input indicative of a decision make a call using a call recording service; select an identity associated with subscriber configuration data stored in the database 365 in the network 300. The subscriber configuration data specifying a manner in which the call recording service is to be provided to the user device 110; and use a Mobile Station International Subscriber Directory Number, MSISDN associated with the selected identity to make the call.

In some examples, the communications, including call requests, may be made via desktop or web applications specializing in providing video chat, voice calls and instant messaging, such as Skype or Microsoft Teams, may be recorded according to the method of recording communications described above in relation to FIGS. 2 and 3.

As will be apparent from the description above, the database 365 is a network element that interfaces with the CSM 355 and the AS 345 and acts as an authentication system for checking the configuration of subscriber's profile to determine if the subscriber is registered for call recording services, among other aspects. The AS 345 is a network element that interfaces with the CSM 355 and the database 365 and acts as a call recording logic system for receiving the configuration of subscriber's profiles and causing the execution of the relevant actions to perform the call recording services, among other aspects. The AS 345 engages in information exchange with the CSM 355 and the SBC 350 to provide the relevant data, such as subscriber's profile, to enable the performance of the appropriate network behaviour for call recording. The AS 345 may run in a virtual application server instance in the mobile network infrastructure and exchange information with the CSM 355 and the SBC 350 on demand. The AS 345 has the capacity to identify call behaviour of the calling and/or called party and determine the MO call behaviour, MT call behaviour and/or an MO call to an MT call behaviour.

The AS 345 may retrieve the recorded subscriber profile from the database 365. The profile information may include: streams configuration—if both streams are to be recorded, mixed, separately or whether only one stream is to be recorded; announcements configuration—if a "call is being recorded" announcement is to be played to caller, called or both users; ringback tone recording configuration—if the ringback tone is to be included in the stream recording; beeps configuration—if beeps are to be included in the call to warn the users that the call is being recorded; failure scenario configuration—if upon failure to record the call is to be terminated or is to continue; and recording devices configuration—in other words, specifying the recording devices to be used, for example, whether physical storage mediums or virtualised storage mediums, hosted or externally hosted, are to be used.

The AS 345 may be triggered by a call request which is either mobile originating, i.e. originating from a subscriber of the call recording service, or mobile terminating, i.e. terminating at a subscriber of the call recording service, and it will have the same behavior in both cases.

The AS 345 is implemented using a set of functions, including: initialisation; geographic determination, Session Description Protocol (SDP) matrix determination, and connectivity management.

The initialisation function verifies the validity of the inbound request of recording communications. The geographic determination function verifies the geographic location of the subscriber of the call recording service. The SDP matrix determination function determines the SDP operations specified by the subscriber profile of the subscriber to the call recording services. The connectivity management function handles SIP interactions between the SBC 350, MRF 340, and the recording device 335.

The initialisation function represents a bootstrap process of the AS 345, the successful outcome of which is loading a subscriber profile and optionally setting session state variables for specific operating behaviour of later functions. The initialisation function includes, upon receipt of call request data, verifying the call request and retrieving subscriber configuration data from the database 365 based on a search.

Following the completion of the initialisation function, the geographic determination function selects an MRF hosted in the same data centre as an SBC which is serving the subscriber, this is achieved by reading the session state variable. In the event of a failure to fetch an MRF allocation based on the executed function, a fallback or default MRF may be defined based on the home country of the subscriber or a local backup MRF hosted in the same data centre as the SBC which is currently serving the subscriber may be selected.

Following the completion of the geographic determination function, the SDP matrix determination function will determine the session description protocol operations for supporting the subscriber's profile and pass the outputs to the connectivity management function together with setting session state variables read from the subscriber profile. The connectivity management function contains the decision logic of which specific type of recording will be implemented by analysing data from the recorded subscriber's profile, i.e. the subscriber configuration data stored in the subscriber's profile.

Upon completion of the functions implemented by the AS 345 as described above, the relevant data is passed to the CSM 355, the SBC 350, and the MRF 340 is invoked by the AS 345, in order to set up the call and call recording services according to the call request data and the outcomes of the functions implemented by the AS 345.

The above examples are to be understood as illustrative examples. Further examples are envisaged. It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the present disclosure, which is defined in the accompanying claims.

NUMBERED CLAUSES

The following numbered clauses describe various examples of the present disclosure:

1. A method of recording communications transmitted via an Internet Protocol Multimedia Subsystem, IMS, network, the method comprising:
   receiving a call request from a first party to call a second party;
   querying a database comprising a plurality of subscriber profiles to obtain subscriber configuration data relating to at least one of the first party and the second party; and
   based on the subscriber configuration data:
      cause a first media stream to be transmitted between the first party and a Media Resource Function, MRF;
      cause a second media stream to be transmitted between the second party and the MRF; and
      cause the MRF to transmit a third media stream from the MRF to a recording device for recording at least part of a call between the first party and the second party.

2. The method according to clause 1, wherein the call request is received at a Session Border Controller, SBC.

3. The method according to clause 1 or clause 2, wherein the subscriber configuration data is processed to select the MRF.

4. The method according to any preceding clause, comprising:
   monitoring whether the third media stream is delivered to the recording device; and
   performing at least one predetermined action based on the monitoring.

5. The method according to any preceding clause, wherein the monitoring comprises continuously receiving a notification indicating whether the third media stream is being delivered to the recording device.

6. The method according to clause 4 or clause 5, wherein the subscriber configuration data is processed to determine the at least one predetermined action to be performed.

7. The method according to clause 6, wherein if it is determined in the monitoring that the third media stream is not delivered to the recording device, the at least one predetermined action comprises stopping transmission of at least one of the first media stream or the second media stream.

8. The method according to any preceding clause, wherein the recording device to which the third media stream is transmitted is determined by processing the subscriber configuration data.

9. The method according to any preceding clause, wherein the third media stream is established by sending a Session Initiation Protocol, SIP, invite to a further SBC associated with the recording device.

10. The method according to any preceding clause, wherein the subscriber configuration data is processed to determine a manner in which the call is established including any of:
   a manner in which any of the first party and the second party are notified that the call is being recorded; and
   a manner in which the third media stream is generated.

11. The method according to clause 10, wherein the third media stream is generated by forking either of the first or second media streams.

12. The method according to clause 10, wherein the third media stream is generated by mixing the first and second media streams.

13. The method according to any of clauses 1 to 9, wherein the third media stream is generated by forking either of the first or second media streams, and the MRF is caused to transmit a fourth media stream from the MRF to the recording device, the fourth media stream being generated by forking the other of the first or second media streams.

14. An application server for enabling recording of communications transmitted via an Internet Protocol Multimedia Subsystem, IMS, network, the application server comprising at least one processor and memory, the memory comprising computer readable instructions which, when executed by the at least one processor, cause the at least one processor to:
   obtain call request data relating to a call request from a first party to call a second party;
   obtain subscriber configuration data relating to at least one of the first party and the second party; and
   based on the subscriber configuration data:
      cause a first media stream to be transmitted between the first party and a Media Resource Function, MRF;
      cause a second media stream to be transmitted between the second party and the MRF; and
      cause the MRF to transmit a third media stream from the MRF to a recording device for recording at least part of a call between the first party and the second party.

15. The application server according to clause 14, wherein the memory comprises computer-readable instructions which when executed by the processor, cause the processor to process the subscriber configuration data to select the MRF.

16. The application server according to clause 14 or clause 15, wherein the memory comprises computer-readable instructions which when executed by the processor, cause the processor to:
   monitor delivery of the third media stream to the recording device; and
   perform at least one predetermined action based on the monitoring.

17. The application server according to clause 16, wherein monitoring delivery of the third media stream to the recording device comprises continuously receiving notification that the third stream is being delivered to the recording device.

18. The application server according to clause 16 or clause 17, wherein the application server is adapted to process the subscriber configuration data to determine the at least one predetermined action.

19. The application server according to clause 18, wherein if it is determined in the monitoring that the third media stream is not delivered to the recording device, the at least one predetermined action comprises stopping transmission of at least one of the first and second media streams.

20. A communications network adapted to record communications transmitted therethrough, the communications network comprising:
   a session border controller, SBC, for receiving call requests from a first party to a second party;
   a database comprising a plurality of subscriber profiles including subscriber configuration data relating to subscribers of a communications recording service;
   a Media Resource Function, MRF; and
   an application server according to any of clauses 14 to 19.

21. The communications network according to clause 20, comprising the recording device.

22. The communications network according to clause 20 or clause 21, comprising a node providing session core functions including any of:
Interrogating Call Session Control Function, I-CSCF;
Serving Call Session Control Function, S-CSCF; and
Break-out Gateway Control Function, BGCF.

23. The communications network according to any of clauses 20 to clause 22, wherein the SBC provides session core functions including any of:
Proxy Call Session Control Function, P-CSCF;
Emergency Call Session Control Function, E-CSCF;
Emergency Access Transfer Function, EATF;
Breakout Gateway Control Function, BGCF;
IMS Access Media Gateway, IMS-AGW;
IMS-Application Level Gateway, IMS-ALG;
Access Transfer Control Function, ATCF;
Access Transfer Gateway, ATGW;
Interconnect Border Control Function, IBCF; and
Transition GateWay, TrGW.

24. The communications network according to any of clauses 20 to 23, comprising a user device, associated with the first party, operable to receive a media stream and/or transmit a media stream.

25. The communications network according to any of clauses 20 to 24, comprising a user device, associated with the second party, operable to receive a media stream and/or transmit a media stream.

26. The communications network according to any of clauses 20 to 25, comprising an evolved communications application server, ECAS, for defining call flow logic in the communication network.

27. A user device comprising at least one processor and at least one computer-readable storage medium, the computer-readable storage medium storing instructions which, when executed by the at least one processor, cause the at least one processor to:
receive a user input indicative of a decision to make a call using a call recording service;
select an identity associated with the user device, wherein the selected identity is associated with subscriber configuration data stored in a database in a communications network, the subscriber configuration data specifying a manner in which the call recording service is to be provided to the user device; and
use a Mobile Station International Subscriber Directory Number, MSISDN, associated with the selected identity to make the call.

What is claimed is:

1. A method of recording communications transmitted via an Internet Protocol Multimedia Subsystem, IMS, network, the method comprising:
receiving a call request from a first party to call a second party;
querying a network-based database comprising a plurality of subscriber profiles to obtain subscriber configuration data relating to at least one of the first party and the second party; and
based on the subscriber configuration data:
selecting a Media Resource Function (MRF) by processing the subscriber configuration data:
causing a first media stream to be transmitted between the first party and the MRF;
causing a second media stream to be transmitted between the second party and the MRF; and
causing the MRF to transmit a third media stream from the MRF to a recording device for recording at least part of a call between the first party and the second party, wherein the recording device is determined by processing the subscriber configuration data.

2. The method according to claim 1, wherein the call request is received at a Session Border Controller, SBC.

3. The method according to claim 1, comprising:
monitoring whether the third media stream is delivered to the recording device; and
performing at least one predetermined action based on the monitoring, wherein the at least one predetermined action to be performed is determined by processing the subscriber configuration data.

4. The method according to claim 3, wherein if it is determined in the monitoring that the third media stream is not delivered to the recording device, the at least one predetermined action comprises stopping transmission of at least one of the first media stream or the second media stream.

5. The method according to claim 1, wherein the monitoring comprises continuously receiving a notification indicating whether the third media stream is being delivered to the recording device.

6. The method according to claim 1, wherein the third media stream is established by sending a Session Initiation Protocol, SIP, invite to a further SBC associated with the recording device.

7. The method according to claim 1, wherein the subscriber configuration data is processed to determine a manner in which the call is established including any of:
a manner in which any of the first party and the second party are notified that the call is being recorded; and
a manner in which the third media stream is generated.

8. The method according to claim 7, wherein the third media stream is generated by:
forking either of the first or second media streams; or
mixing the first and second media streams.

9. The method according to claim 1, wherein the third media stream is generated by forking either of the first or second media streams, and the MRF is caused to transmit a fourth media stream from the MRF to the recording device, the fourth media stream being generated by forking the other of the first or second media streams.

10. An application server for enabling recording of communications transmitted via an Internet Protocol Multimedia Subsystem, IMS, network, the application server comprising at least one processor and memory, the memory comprising computer readable instructions which, when executed by the at least one processor, cause the at least one processor to:
obtain call request data relating to a call request from a first party to call a second party;
obtain subscriber configuration data relating to at least one of the first party and the second party; and
based on the subscriber configuration data:
select a Media Resource Function (MRF) by processing the subscriber configuration data;
cause a first media stream to be transmitted between the first party and the MRF;
cause a second media stream to be transmitted between the second party and the MRF; and
cause the MRF to transmit a third media stream from the MRF to a recording device for recording at least part of a call between the first party and the second party, wherein the recording device is determined by processing the subscriber configuration data.

11. The application server according to claim 10, wherein the memory comprises computer-readable instructions which when executed by the processor, cause the processor to:

monitor delivery of the third media stream to the recording device; and perform at least one predetermined action based on the monitoring wherein the at least one predetermined action to be performed is determined by processing the subscriber configuration data by the application server.

12. The application server according to claim 11, wherein monitoring delivery of the third media stream to the recording device comprises continuously receiving notification that the third stream is being delivered to the recording device.

13. The application server according to claim 12, wherein if it is determined in the monitoring that the third media stream is not delivered to the recording device, the at least one predetermined action comprises stopping transmission of at least one of the first and second media streams.

14. A communications network adapted to record communications transmitted therethrough, the communications network comprising:

a session border controller, SBC, for receiving call requests from a first party to a second party;

a Media Resource Function, MRF:

a database comprising a plurality of subscriber profiles including subscriber configuration data relating to subscribers of a communications recording service, wherein the subscriber configuration data specify a Media Resource Function (MRF) to be selected for transmitting a first media stream to be transmitted between the first party and the MRF and a second media stream between the second party and the MRF by processing the subscriber configuration data; and an application server according to claim 10.

\* \* \* \* \*